United States Patent
Francis et al.

(10) Patent No.: US 7,689,995 B1
(45) Date of Patent: Mar. 30, 2010

(54) RESOLVING SCHEDULING CONFLICTS IN A RECORDING DEVICE

(75) Inventors: Stephen S. Francis, Saratoga, CA (US); Johannes Schmidt, Los Altos Hills, CA (US); David Daney, San Jose, CA (US); Kevin Shen, Sunnyvale, CA (US)

(73) Assignee: Avtrex, Inc., San Jose, CA (US)

( * ) Notice: Subject to any disclaimer, the term of this patent is extended or adjusted under 35 U.S.C. 154(b) by 1202 days.

(21) Appl. No.: 10/754,443

(22) Filed: Jan. 8, 2004

Related U.S. Application Data (60) Provisional application No. 60/439,068, filed on Jan. 8, 2003.

(51) Int. Cl.
*G06F 9/46* (2006.01)

(52) U.S. Cl. ...................................... 718/104
(58) Field of Classification Search ................... 718/104
See application file for complete search history.

(56) References Cited

U.S. PATENT DOCUMENTS

| | | | |
|---|---|---|---|
| 5,214,556 A | 5/1993 | Kilbel et al. | |
| 5,978,785 A * | 11/1999 | Johnson et al. | ............... 706/54 |
| 6,798,974 B1 | 9/2004 | Nakano et al. | |
| 7,171,677 B1 | 1/2007 | Ochiai | |
| 7,283,970 B2 * | 10/2007 | Cragun et al. | ................... 705/8 |
| 2002/0040475 A1 | 4/2002 | Yap et al. | |
| 2002/0109732 A1 | 8/2002 | Ward, III et al. | |
| 2002/0118954 A1 * | 8/2002 | Barton et al. | ................... 386/83 |
| 2003/0009520 A1 * | 1/2003 | Nourbakhsh et al. | ......... 709/204 |
| 2003/0037151 A1 * | 2/2003 | Montvay et al. | ............ 709/229 |
| 2003/0086023 A1 | 5/2003 | Chung et al. | |
| 2003/0188316 A1 | 10/2003 | DePrez | |
| 2003/0193619 A1 | 10/2003 | Farrand | |
| 2003/0237093 A1 | 12/2003 | Marsh | |
| 2004/0258390 A1 | 12/2004 | Olson | |

FOREIGN PATENT DOCUMENTS

EP          1134972 A2       9/2001

* cited by examiner

*Primary Examiner*—Meng-Ai An
*Assistant Examiner*—Mengyao Zhe
(74) *Attorney, Agent, or Firm*—Fish & Richardson P.C.

(57) ABSTRACT

Techniques for resolving scheduling conflicts for recording events are described. A user selects events that the user wishes to record. A PVR determines the times and sources at which each of recording can occur. The PVR determines a schedule for recording all of the user's requested events or as many events that can be recorded according to the resources available to the PVR. The PVR can be triggered to determine the schedule each time a new recording event is either added to deleted. The PVR can also determine the schedule each time the PVR receives updated or new scheduling information. If more than one schedule is determined, the PVR can present the schedules to the user for selection. The user's selection can be subsequently used to inform the PVR of the user's preferences the next time schedules are determined.

21 Claims, 8 Drawing Sheets

| | 5:30 | 6:00 | 6:30 | 7:00 | 7:30 | 8:00 | 8:30 |
|---|---|---|---|---|---|---|---|
| 6 | B (408) | D (430) | C (414) | D (436) | $X_1$ | D (440) | B (420) |
| 7 | $X_2$ | A (402) | C (426) | $X_3$ | $X_4$ | $X_6$ | $X_{12}$ |
| 8 | $X_5$ | | E (442) | | | | $X_{13}$ |
| 9 | $X_7$ | F (450) | | $X_8$ | | | $X_{14}$ |
| 10 | $X_9$ | | $X_{10}$ | | | $X_{11}$ | $X_{15}$ |

| | JOB A | JOB B | JOB C | JOB D | JOB E | JOB F |
|---|---|---|---|---|---|---|
| RECORDING TIME | Solution 1<br>Null solution | Solution 1<br>Solution 2<br>Null solution | Solutions 1 & 2<br>Null solution | Solution 1<br>Solution 2<br>Solution 3<br>Null Solution | Solution 1<br>Null Solution | Solution 1<br>Null Solution |
| QUALITY | Solution 1<br>Null solution | Solution 1 & 2<br>Null solution | Solution 1<br>Solution 2<br>Null Solution | Solns 1, 2 & 3<br>Null solution | Solution 1<br>Null Solution | Solution 1<br>Null Solution |
| USER'S PRIOR SELECTION | Solution 1<br>Null solution | Solution 1 & 2<br>Null solution | Solution 1<br>Solution 2<br>Null Solution | Solns 1, 2 & 3<br>Null solution | Solution 1<br>Null Solution | Solution 1<br>Null Solution |

RESOLVING SCHEDULING CONFLICTS IN A RECORDING DEVICE

CROSS-REFERENCE TO RELATED APPLICATIONS

This application claims benefit to U.S. Provisional Application No. 60/439,068, filed Jan. 8, 2003, which is hereby incorporated herein by reference.

BACKGROUND

This invention relates to personal video recorders. A personal video recorder (PVR) improves upon the recording capabilities of a conventional video cassette recorder (VCR) by recording video events, such as broadcast events, television programs or segments of programs, onto a drive (e.g., a hard disk drive). Typical VCRs require a user to record onto tape style media. The disadvantages of a VCR tape may include limited recording time per tape, typically less than six hours, and potential degradation in recording quality when the tape is reused for recording. Replacing the tape with a hard drive can allow for extended recording time, such as around 100 hours or more. More recording time can provide the user with the ability to select many events to be recorded rather than just a few hours of programming. The user can plan out a programming schedule that extends many days or weeks in the future. Another advantage of using a drive for recording events includes the ability to record events simultaneously, i.e., two programs that are broadcast on two different channels at the same or overlapping times. A further advantage of using a drive for recording events is a user can watch one or more recordings at the same time, including starting to watch a program before the program is fully recorded.

Recording events can also be made easier using a PVR. Typically the PVR works with user friendly input devices. The PVR can download program schedules or events from a phone line, satellite, cable or Internet, display the program schedule, and receive a user's input selecting each desired recording event. Alternatively, the user can manually enter an event, either by inputting the event title, performing a search for events according to keywords, or inputting the desired source and time of recording.

Because of the vast array of programs on television at any one time, a user may have multiple programs that he or she is interested in recording that take place simultaneously. Even though some PVRs are capable of recording multiple programs at one time, there is typically a limit to the number of simultaneous events that can be captured. Depending on the user's recording interests, scheduling conflicts may arise when a user schedules too many programs to be recorded at one time.

SUMMARY

The invention provides methods implementing techniques for resolving scheduling conflicts in a recording device. When recording multiple jobs, such as television programs, movies or other broadcast events, is desired, scheduling conflicts between the various jobs can arise. Each job requires resources to accomplish recording the job. Resources typically are limited, which in turn can cause the conflicts. The techniques provided herein determine resource allocation for accomplishing recording the desired jobs. Further, the techniques can base a recording schedule, or plan, on user preferences and user assigned priorities.

In general, in one aspect, the invention features a method for determining a recording schedule for a PVR system with resources. A first user input requesting jobs is received. Solutions for the jobs are determined based on a schedule, each solution requiring a set of resources over a set of intervals, where a number of resources required is greater than a number of resources available. Plans are determined, each plan having a solution for each of the jobs wherein resources used by the jobs are less than or equal to the number of resources available at each interval.

Aspects of the invention may include none, one or more of the following advantages. Because each PVR has limited recording resources, conflicts can arise when a user identifies more recording events than the PVR is capable of recording at one time. Prioritizing each event to be recorded may allow a PVR to automatically determine a recording schedule that captures the programs a user would most want recorded when the user's recording choices conflict. Prioritizing may not capture all of the user's most desired programs, but may determine a schedule that is a close fit to what the user desires. Moreover, a PVR using this approach can present viable alternatives to the closest fitting plan to a user. The PVR may determine one or more schedules without compiling every single recording schedule that may be available. A new recording schedule or set of schedules can be determined each time the PVR receives input, whether the input is from a user or from an electronic input.

The PVR may be able to determine the schedule not only based on the user's assigned priorities for each event, but may also include other factors, such as the time the event is recorded, the genre the event falls into, the name of the event, the quality of the recording, whether bonus time is desired, or the source of the recording. The PVR may also learn the preferences of the user based on prior decisions the user has made regarding selecting one recording schedule over another. The learned preferences may be used in a future determination by the PVR. The PVR can provide the user with multiple recording schedule options, potentially providing the user with recording flexibility. The PVR may also allow multiple users to have their own usernames so that one user's preferences do not affect another user's profile. The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
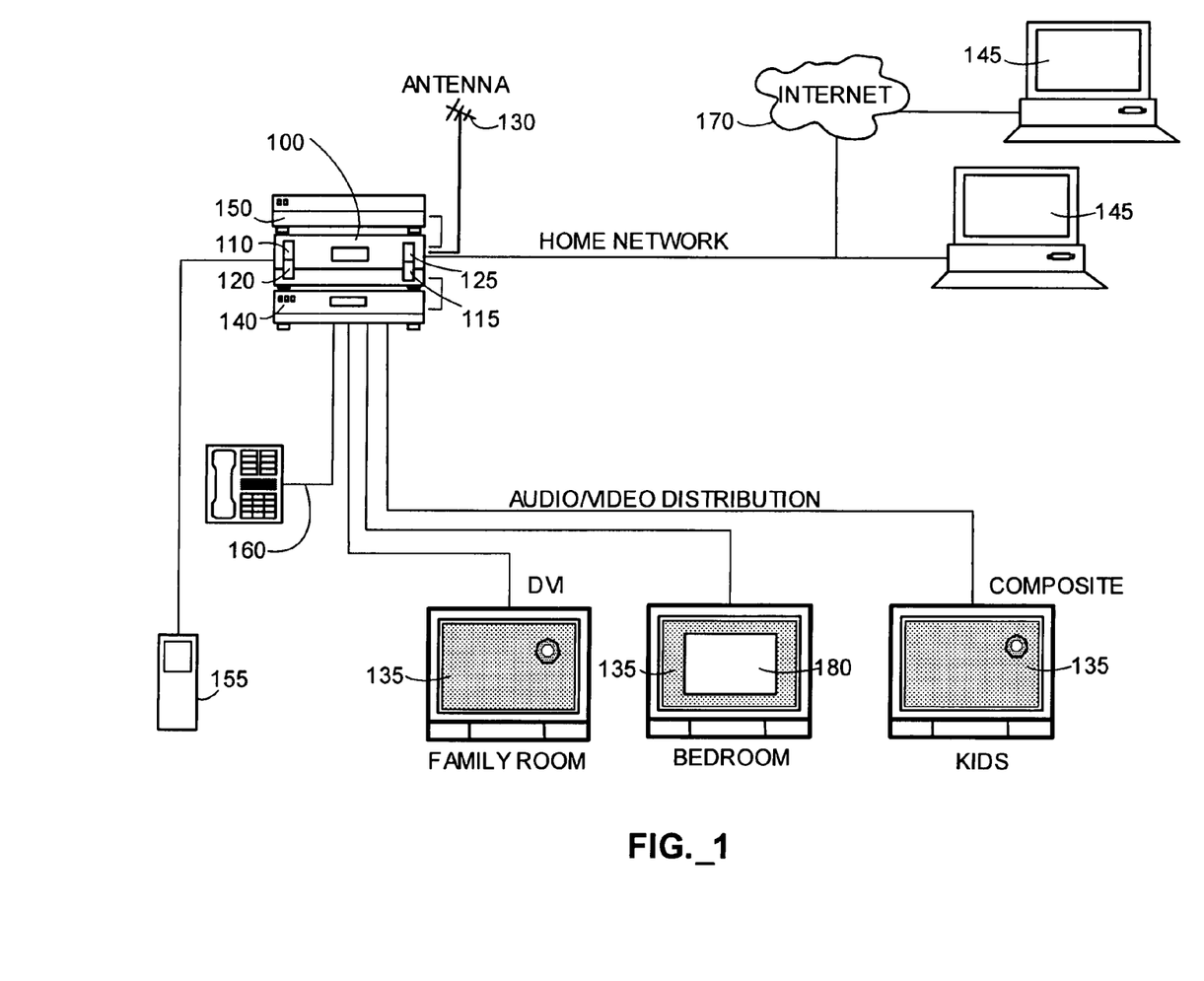
FIG. 1 shows a PVR system in connection with input and output devices.

Referring to FIG. 1, a PVR system 100 includes one or more tuners 110, a server, a conflicts resolution engine 115 and a search engine 125. The server 120 includes a drive for recording incoming data. The PVR 100 can be connected to a number of inputs and outputs. The inputs can include an antenna 130, cable 140, satellite 150, remote control 155, phone line 160 or a network 170 (e.g., the Internet). PVR 100 can download information, such as schedules or streamed video, from the inputs in addition to receiving broadcast events. Network 170 can also be used to control the PVR 100 remotely. The outputs can include televisions 135, computers 145, remote controls 155 or other display devices. The PVR includes a user interface 180 for accepting user input. The user interface 180 can be displayed on a television, computer 145 or remote 155, such as a PDA or a remote control including a viewing screen. Depending on the number of tuners and the server, PVR system 100 can be configured to record a single channel or source at one time, or multiple sources simultaneously.

Figure 2:
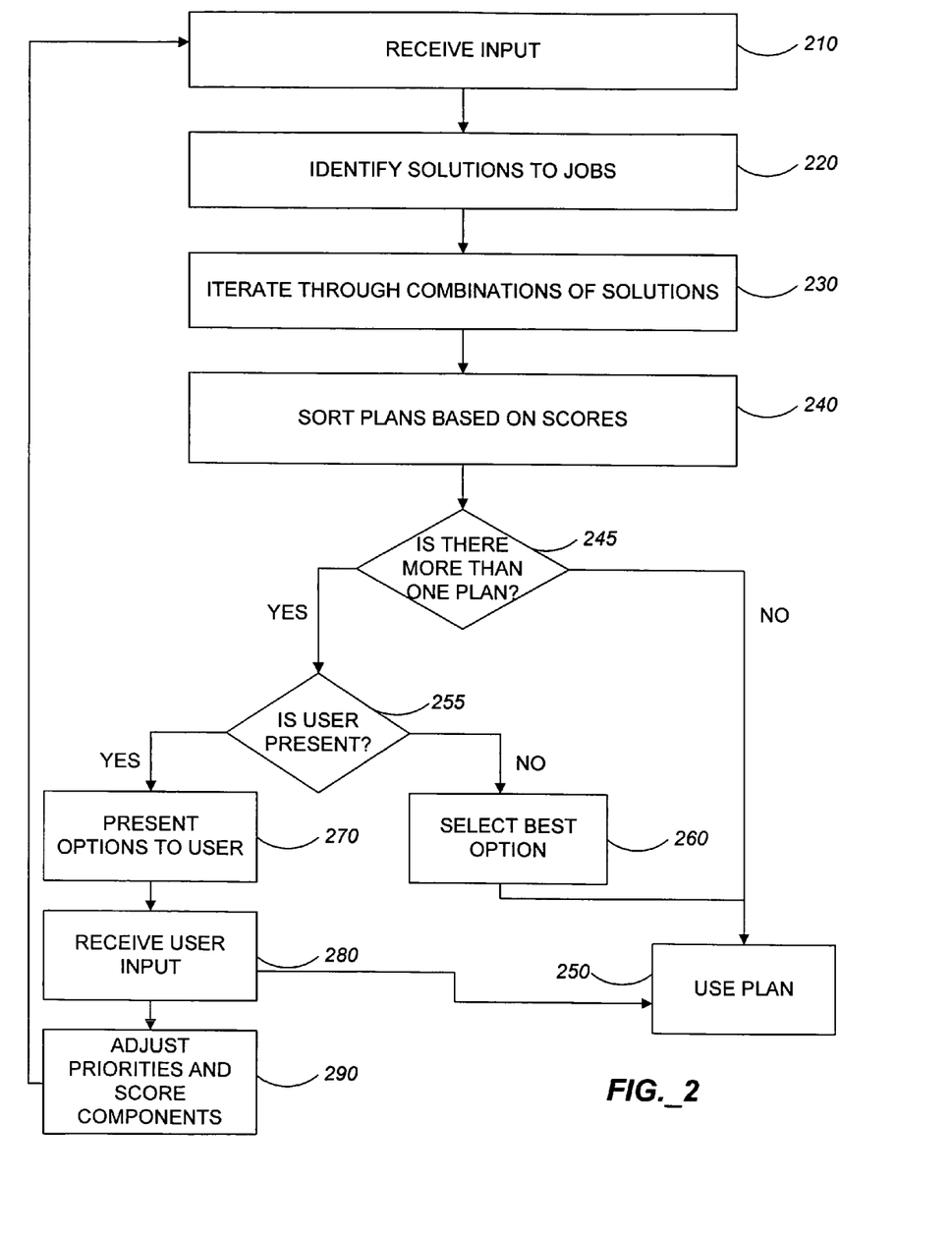
FIG. 2 shows a flow chart of the scheduling steps performed by a conflict resolution engine.

Referring to FIG. 2, a method of determining a recording schedule performed by the conflicts resolution engine is described. A PVR system 100 (hereinafter PVR) receives input (step 210). The PVR can accept multiple types of input. One type of input includes a new or revised schedule. Periodically, a new program schedule is communicated to the PVR, such as by satellite, cable or internet. The new schedule can add programming information to a new time slot, such as a new day's programs, or the new schedule can be a revised schedule that includes new programs in one or more time slots, a shifted time slot for an existing program or a cancelled program. Another input is user input indicating a program or block of time on a selected channel to be recorded. The user can select from a guide-style list of program titles, input a search for a particular program or input desired programs by keyword, such as an actor's name or a subject matter. Each program or time segment that is selected for recording or each task that is to be accomplished is referred to hereinafter as a job. The input can also include canceling a job rather than requesting a job.

In one implementation, a user can input a priority level for each job. The priority level can indicate how important accomplishing the job is to the user. Three or five priority levels are typically sufficient for the user to differentiate the priority of one job from another, however, any number of priority levels can be provided to the user. The user can also indirectly assign a priority to each job, as described further herein below. A default priority can also be assigned, such as a middle priority. The user can indirectly modify the default, such as by explicitly requesting jobs to be recorded at a particular time. In one implementation, the jobs that are specified by time can be assigned a higher priority than jobs that are part of a request to record all of a general type of job, such as all episodes of a program. In one implementation, the order in which the jobs are input can also affect their priority. The last input jobs can either have the highest priority or the lowest priority depending on whether the PVR assigns a higher priority to a first in or first out job. In one implementation, the priority assigned by the user can be a major priority and an additional minor priority and subminor priority can also be assigned to each job. The minor and subminor priorities can be determined and adjusted automatically in response to user input, such as the user selecting one solution over another as described further below. In one implementation, the major priority can be adjusted by the conflicts resolution engine as discussed below.

Upon receiving input, solutions are determined for each job (step 220). Each job has at least a null solution, that is, a solution defined by not recording the job. Additionally, there is typically at least one other solution that includes accomplishing the job. There may also be other solutions for the job, such as, recording the same job at a different time slot. In some cases, the same job can be accomplished on a different input, such as on a different channel or at a higher-fidelity tuner, such as at high definition (HDTV) quality rather than at standard definition (NTSC) quality. In one implementation, each solution has a resource interval list. A, resource interval list includes a list of time intervals, and for each time interval how much and what resource is required. The resources can be tuners available to the PVR, CPU, memory, network bandwidth, or any other limited resource that may be required to accomplish a particular solution. If multiple tuners are available, a job can have a different solution for each tuner. Alternatively, tuner assignment can be performed independently assuming each tuner is equivalent.

The PVR iterates through combinations of solutions to formulate plans (step 230). A particular combination of solutions that can be used together, or the solutions for each respective job that can be accomplished simultaneously, is referred to hereinafter as a plan. In one implementation, a plan does not exceed the available resources. With a limited number of jobs or a limited number of solutions available for each job, determining every available plan tends to produce just a few plans. However, above a particular number of jobs or solutions for each job, the processing time for determining every possible plan can increase beyond a reasonable length of time. Determining all possible plans can be computationally expensive for the PVR. Accordingly, the plans can be filtered including filtering plans as they are produced dependent upon a comparison of a given plan (or solutions of a plan) with a previously produced plan as will be discussed in greater detail below.

One possible filtering solution includes the PVR determining the plans that best fit the user's desired recording scheme based on ratings. Ratings can include one or more factors, including the user assigned priority for each job and other components of each solution for each job. Each solution can have various components, such as, the recording time, the recording quality, whether bonus time is included, or a preferred channel, such as recording the job on a PBS station rather than on a cable station. Solutions can also have other factors that the user desires to differentiate one solution from another. Regarding the recording time component, a solution that includes recording at a time sooner over later is often preferred. When multiple recording qualities are available, a higher quality recording is often ranked higher than a lower quality recording. A solution that is defined by recording a job on a station that has fewer commercial breaks may be preferred over a solution defined by recording a job on a station with more frequent commercial breaks.

Including bonus time before or after a job can be preferred over not including bonus time. Bonus time is defined as time that is added to the beginning or end of a job so that the interval is extended. An example of bonus time is to begin recording a job a few minutes before the job begins. In some geographical locations programming falls ahead or behind schedule, and television programs that start late tend to end late. Capturing a few minutes past the scheduled interval for a job can ensure that the whole job is recorded. Additionally, some types of events, including sporting events, award programs and political broadcasts, do not run according to schedule. Adding bonus time to the beginning or end of these intervals may be important to the user. Other jobs that may run late are jobs that follow an earlier program that runs late, putting the whole broadcast schedule behind. Rules can help the PVR determine both the likelihood of bonus time being required and the likely duration of the bonus time. The priority of a job can also influence the duration of the projected bonus time. A higher priority job may have more bonus time added than a lower priority job.

By assigning individual preferences to different aspects of a solution, such as the preference of recording sooner over later or preferring to record a job with bonus time over recording the job without bonus time, some filtering of plans can occur. In one implementation, the user is not presented with a plan in which every chosen solution is worse than the corresponding solutions in another plan. An example of filtering based on preferences follows. If the PVR can record job A today or tomorrow and job B with bonus time or without bonus time, at least four plans having no null solutions may be available. If the user prefers to record sooner over later and prefers recording a job with bonus time, filtering selects a plan that records job A today and job B with bonus time. If recording job A today and job B with bonus time is incompatible, as described further below, then two plans can be considered (i.e., a first plan where the system records job A today and job B with no bonus time and a second plan where the system records job A tomorrow and job B with bonus time).

A factor in determining the plans is the resources that the PVR has available. The PVR is limited by its associated number of tuners, as well as network, CPU, and memory bandwidth constraints. The PVR can maintain a list of currently-allocated resources to determine whether a job can be performed. The list can be indexed by time (i.e., given a range of times, the system can access the list and return a list of used resources). Each resource usage can also include a reference to which solution is using the resource. The system can also maintain and access a data structure that includes not just the resources used by the current set of solutions, but the resources used by all solutions. This data structure can be denoted as the all solutions resource list.

One simple structure for monitoring resource usage is a treeset of times, each with a hashmap indexed by resource, containing the amount of the resource used and the list of solutions using the resource. The indicated resource is used until the following time in the treeset.

Figure 3:
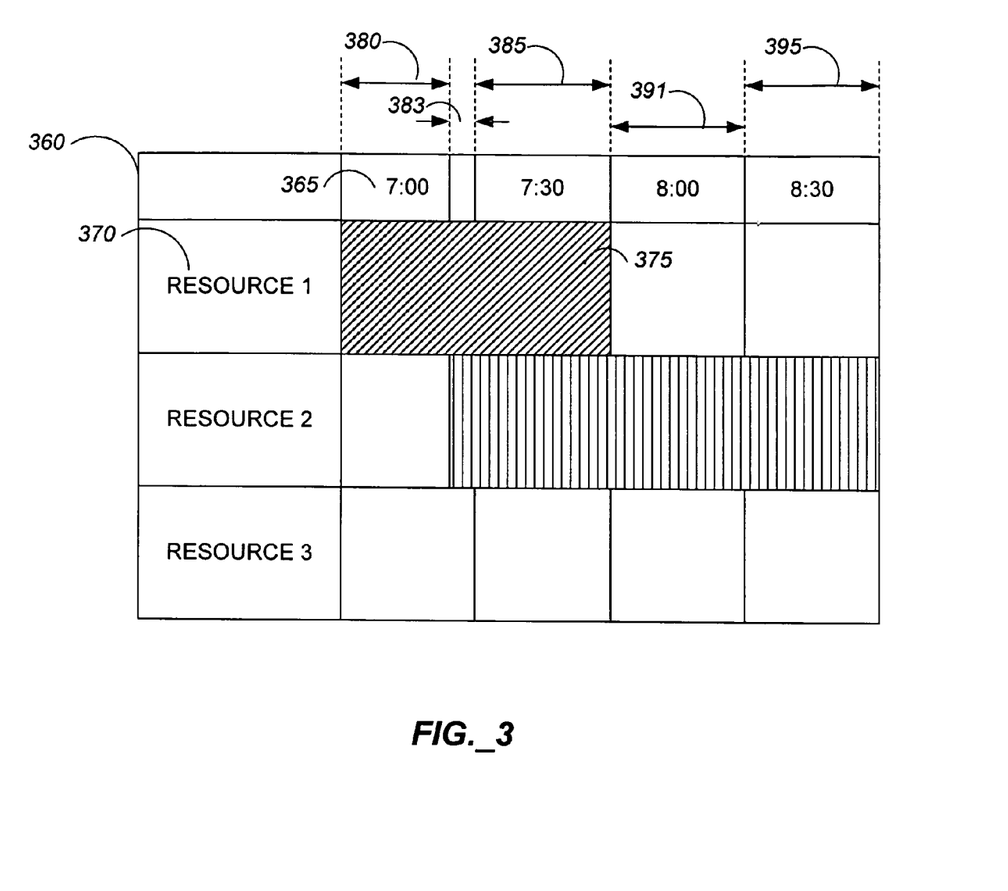
FIG. 3 a chart of resource use according by time.

Referring to FIG. 3, an alternative implementation describes resource usage using a small integer. A 2d array 360 with time 365 can be formed on one axis and each unit of each resource 370 on another axis, with the array 375 content referring to the solution. This requires a preliminary pass to create an array index versus calendar time lookup. During a preliminary pass, each unique interval (e.g., resource usage start or stop) is collected. These times are sorted and assigned unique integers which become the time index. Time index zero 380 is from 7:00 to 7:25, time index one 383 is from 7:25 to 7:30, time index two 385 is from 7:30 to 8:00, time index three 391 is from 8:00 to 8:30 and time index four is from 8:30 to 9:00.

Each plan is defined by a single solution for each job. In one implementation, a plan cannot exceed the available resources. In cases with limited resources, a plan may include choosing one or more null solutions. In one implementation, the plans are compiled by determining a score for each solution. The scores for each solution can be based on the priorities and the solution components. As an example of scoring, the priorities can have a score and the solution components, such as the time of recording, the quality of the recording and the source, can each have a score. In one implementation, the score is merely a relative high or low score. In another implementation, the score is a numeric value. Typically, recording a job earlier is preferred over recording later and recording in high definition is preferred over standard definition. In some cases, the only solution that may be compatible with other solutions is the null solution.

In one implementation, a first plan is compiled by selecting a high scoring solution to the first job. A solution for each of the other jobs is selected that is compatible with the solution for the first job. The first plan is saved. A second plan is compiled by selecting a high scoring solution for a job, such as the first job or a second job. Compatible solutions are found for the second plan. The second plan is compared with the first plan. If the solution for at least one job of the second plan is as good as or better than the solution for the corresponding job for the first plan, the second plan is kept. If no solution for any job in the second plan is as good as or better than the corresponding solution for the same job in the first plan, the second plan is discarded (e.g., filtering the plan). Similarly, the first plan can be compared to the second plan. If no solution in the first plan is as good as or better than the corresponding solution of the second plan, the first plan can be discarded (e.g., filtered). In one implementation, at least two plans are always stored once more than two plans are compiled. The method of comparing each corresponding solution of each plan means that regardless of whether a better or best plan or a worse or worst plan than all of the possible plans is determined first, plans that are worse in every way from plans that have already been compiled are discarded.

In one implementation, plans are compiled until there are no remaining combinations of solution, i.e., every possible plan is compiled. In one implementation, plans are compiled until the only remaining combinations of solutions would include less desirable, or lower scoring, solutions than have already been compiled. Filtering allows for not every possible plan to be considered. The search can be pruned once only worse plans are left to be compiled.

In one implementation, recording jobs of a higher priority is more important than recording every job and therefore selecting a null solution on more important jobs is avoided when jobs are compiled using high scoring solutions. In one implementation, better plans tend to include selecting a non-null solution for the highest priority jobs. In another implementation, recording more jobs is more important than recording the highest priority jobs. Compiling the plans and comparing the plans effectively filters out the less desirable plans. Other methods of determining the better plans can also be used and are described further below.

Referring again to FIG. 2, the plans that have been compiled are scored and sorted (step 240). In addition to having an assigned priority, each plan can be assigned a score. To calculate a score for a single plan, the scores of each individual solution associated with the plan can be added together. In one implementation, the priorities and solution components receive weighted scores. A weighted score can be defined by assigning more points to the user's priorities and fewer points to each of the solution components. The weighted score can be further defined by assigning more points to some of the solution components than other of the solution components. A null solution may have a score that is consistently lower than a non-null solution. Once each of the solutions is assigned a score, the score for each plan can be tabulated. The plans can then be sorted in order of their assigned scores. In one implementation, the filtering step is independent of assigning scores and the higher scores are not necessarily indicative of a better plan. In one implementation, because the solutions can be weighted, when the plans are filtered a plan with a higher score can be filtered out while a plan with a lower score is kept as a better plan.

After scoring the plans, the PVR determines whether there is more than one plan option (step 245). If there is only one plan option (the "no" branch of 245), the PVR uses the available plan (step 250). Alternatively, the PVR can determine whether there is only one plan prior to scoring the plans. If only plan exists, scoring the plan is optional.

If there is more than one plan option (the "yes" branch of 245), the PVR then determines whether user input is available (step 255). Generally, if a user has input a job request, user input for plan selection is available. If the input received by the PVR is not user input, but is a type of automated input, such as, from a satellite including a new schedule, a user may not be present to provide input (the "no" branch of 255). In this case, the PVR selects the best plan available (step 260). The best plan available can be selected as the plan with the highest score.

When a user is present, the plan options are presented to the user (step 270). The plans can be presented in the order of the scores attributed to each plan. When there is more than one plan, plans can fall into one of two categories of plans. In a first category, every job has a non-null solution (i.e., every job can be accomplished). In a second category, not every job has a non-null solution, or there are jobs that cannot be recorded. In some cases, only one plan with at least one non-null solution is available. The PVR can present only the plans where all jobs are recorded and inform the user that there are other plans available. Alternatively, the PVR can present all of the plans to the user. In cases where the only plans that are available include some null solutions, these plans can all be presented to the user. The filtering step tends to produce about five or fewer options, reducing the number of choices the user has available for selection. Alternatively, filtering can be arranged to produce any number of results, such as twenty, ten or fewer jobs. The PVR can use the selected plan (step 250).

If there is more than one plan option presented to the user, the PVR receives the user input selecting one of the plans (step 280). Alternatively, a user can select one plan over another. Examples of user choices can include the user selecting a comedy sit-com series over a dramatic series, one particular drama over another or a mini-series over a movie. The PVR can track the characteristics or components of the job, such as the type of program, the name or the genre. The PVR can extrapolate from the user's selection a sub-priority assigned to each job. An example of the PVR assigning the subs-priority can be a user previously selecting episodic programs of a program, the user selecting a certain genre, or the job sharing a common characteristic, such as time of day, day of week, program source, keywords or other characteristic with a newly requested job.

Based on the user's selection, the PVR can adjust job priority and score (step 290). The next time plans are compiled and presented in response to an input, the new priority or score can be factored into the filtering scheme. The sub-priorities can be included in the ranking each time the plans are compiled and filtered. This allows the PVR to learn a user's preferences based on both the user's input priorities and user's plan choices. Because one of the objects of tracking user choice can be based on the user's preferences, the PVR can set up individual user accounts so that multiple users of a single PVR can have individual profiles and the PVR can track the individual users. In one implementation, a PVR can have a master user whose preferences are not overridden by other user's selections.

In one implementation, each time an input occurs, the PVR determines solutions and iterates through combinations of plans. Performing the steps of the method can be triggered by an update to the program guide, such as changes to the programs or the addition of new data, the addition or removal of a user-specified recording event, a change in priority of an existing scheduled event or a change in system resources, such as the addition or deletion of a PVR tuner. When the trigger for re-evaluation of the recording schedule has not originated from the user, the system can generate a user alert and receive user input that identifies an explicit choice between the new alternatives. In one implementation, the user can be notified of this choice by a message, such as a message on the television or even a short mail by mobile telephone.

After a job has been recorded, it can be possible to explicitly determine the amount of time the show used. This information can be received from the network program schedule information update, out of band messaging or peer-to-peer alerts. The PVR system can modify a job that has been recorded when a post recording determination of the actual duration of the event is received by the PVR. The modification can be the truncation of extra time recorded beyond the end of the job. The surplus time can be eliminated from storage. A job that extended beyond recording time can be marked incomplete if insufficient recording was made. The PVR can also adjust the recording time to extend to the end of a job that runs over its originally determined duration if the information is timely received and recording the rest of the job does not interfere with other jobs.

Figure 4A:
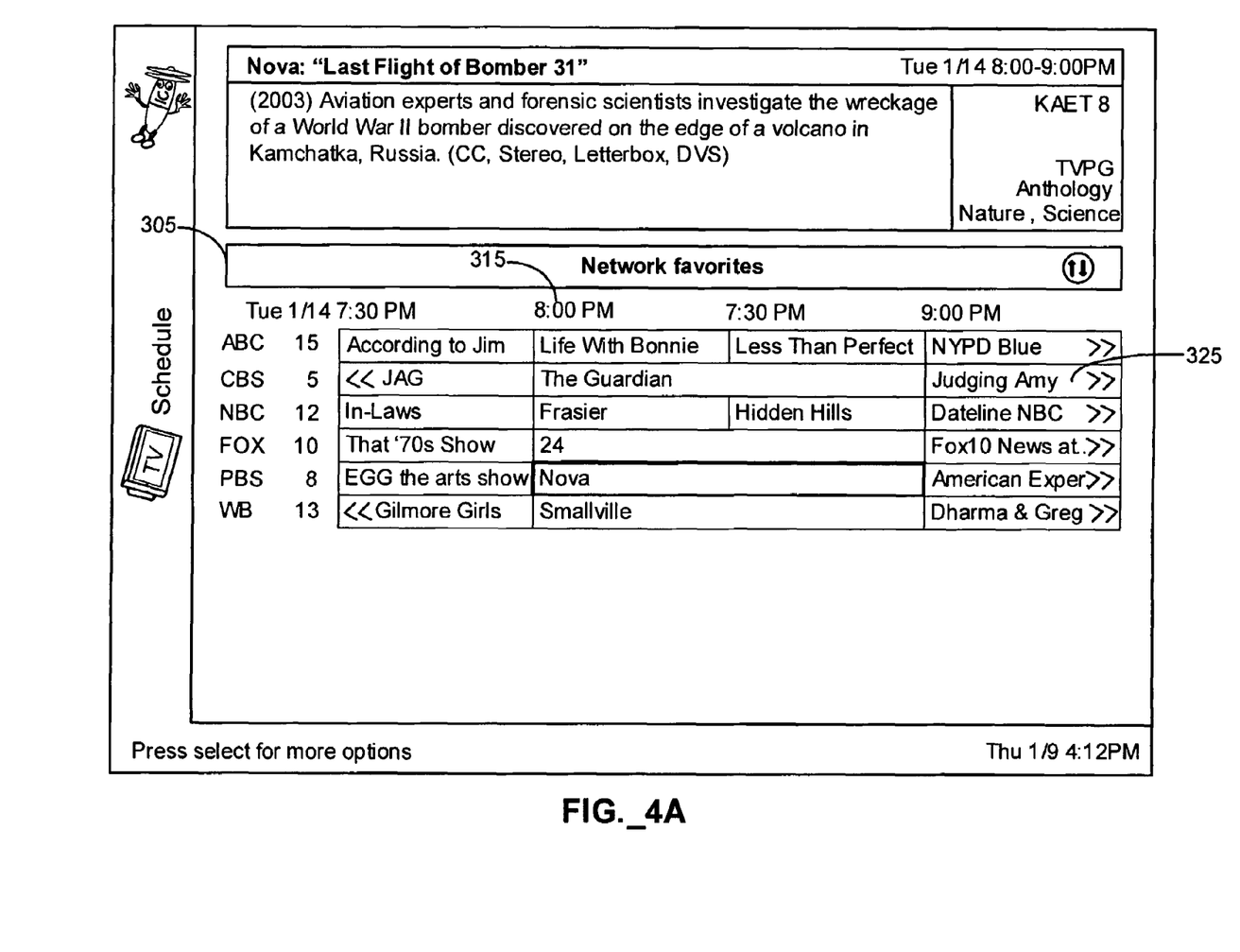
FIG. 4A shows a grid style television schedule.
Figure 4B:
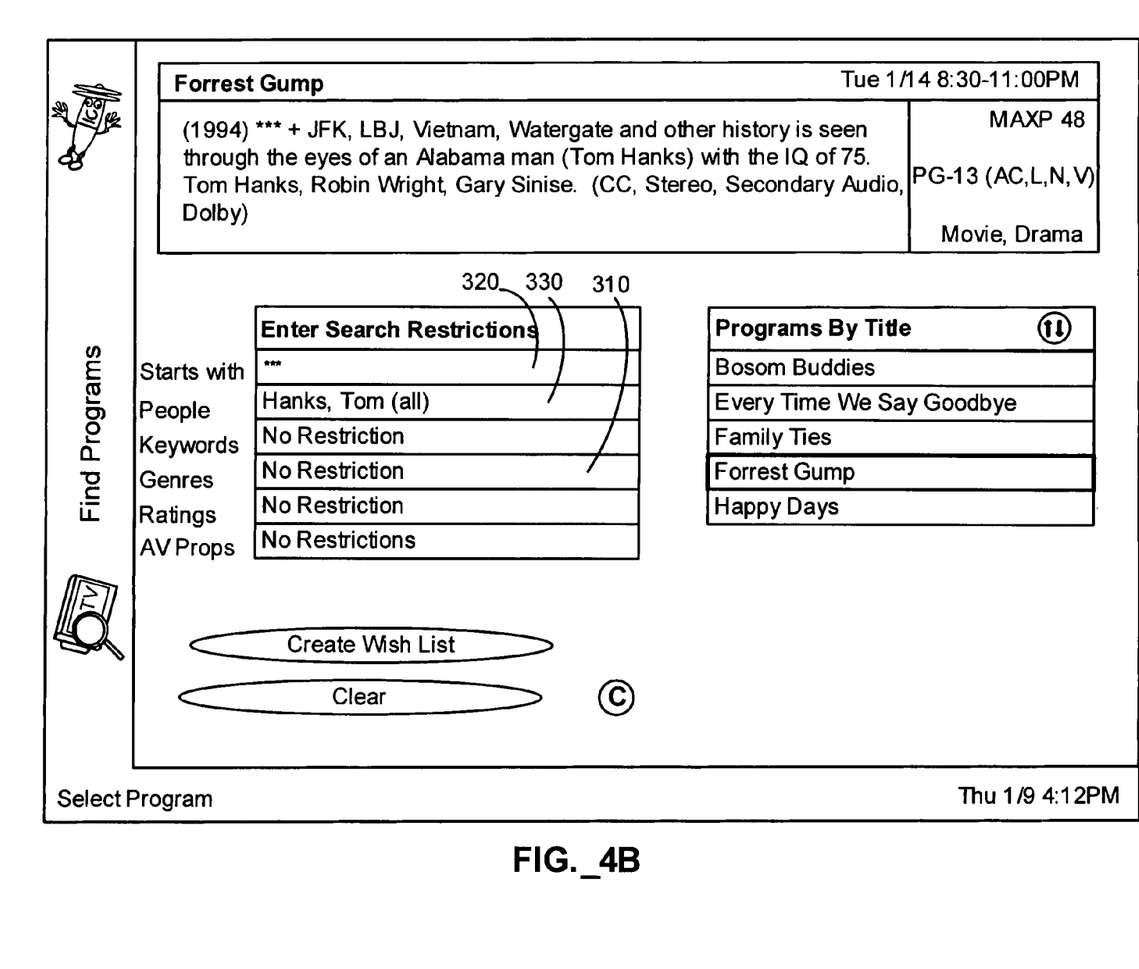
FIG. 4B shows a search screen.

An example of a PVR user interface is shown in FIGS. 4A and 4B. The user can be presented with a guide style grid 305 with all the programs 325 listed with their run times 315, as shown in FIG. 4A. Alternatively, the user can be presented with a searchable list of programs, as shown in FIG. 4B. The search parameters can be based on the program's genre 310, title 320, actors 330, or other attributes.

An example of a PVR resolving conflicts is described below. In this example, the PVR system includes two separate PVRs that are in communication with one another and can be used in tandem with one another. The first PVR is configured to record in high definition, the second PVR is configured to record in standard definition. Each PVR can record one program at a time. A user interface is provided that allows a user to select the programs or combinations of times and channels that the user wishes to record to create each job. The user selects the desired programs, creating jobs, until all desired new jobs are entered. The user can also enter whether bonus time is to be recorded at the beginning or end of the program, including how much bonus time is desired. The user can then enter a priority for each job. In this example, the user has a choice between five priority assignments, priority one being the highest priority and five the lowest.

In the example, the user has previously selected episodic programs, including programs A, B and C. The user then adds jobs D, E and F to the job list. Jobs A and F are assigned a priority of 5, jobs B and C are assigned a priority of 2, job D is assigned a priority of 4 and job E is assigned a priority of 1.

| Job | Priority |
| --- | --- |
| A | 5 |
| B | 2 |
| C | 2 |
| D | 4 |
| E | 1 |
| F | 5 |

Figure 5:
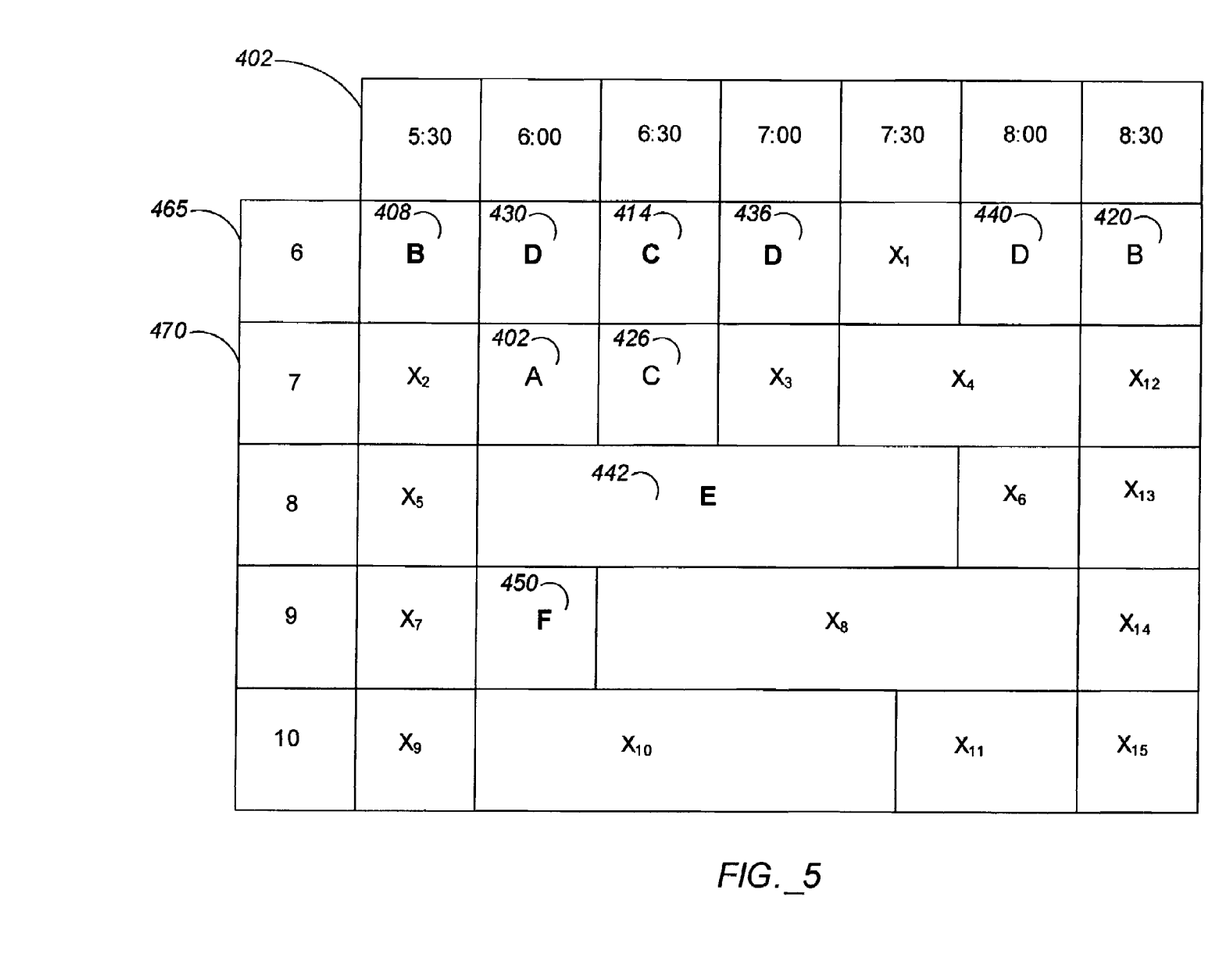
FIG. 5 shows a grid style television schedule with jobs.

Upon receiving the new input, the PVR identifies solutions to jobs A, B, C, D, E and F. The system determines that each job has a null solution. In addition, according to the presently available schedule 400, job A has one non-null solution 402 (i.e., program A is broadcast only one time), job B has two non-null solutions, 408, 420, job C has two non-null solutions 414, 426, job D has three non-null solutions 430, 436, 440, job E has one non-null solutions 442, and job F has one non-null solution 450 as shown in FIG. 5.

Figure 6:
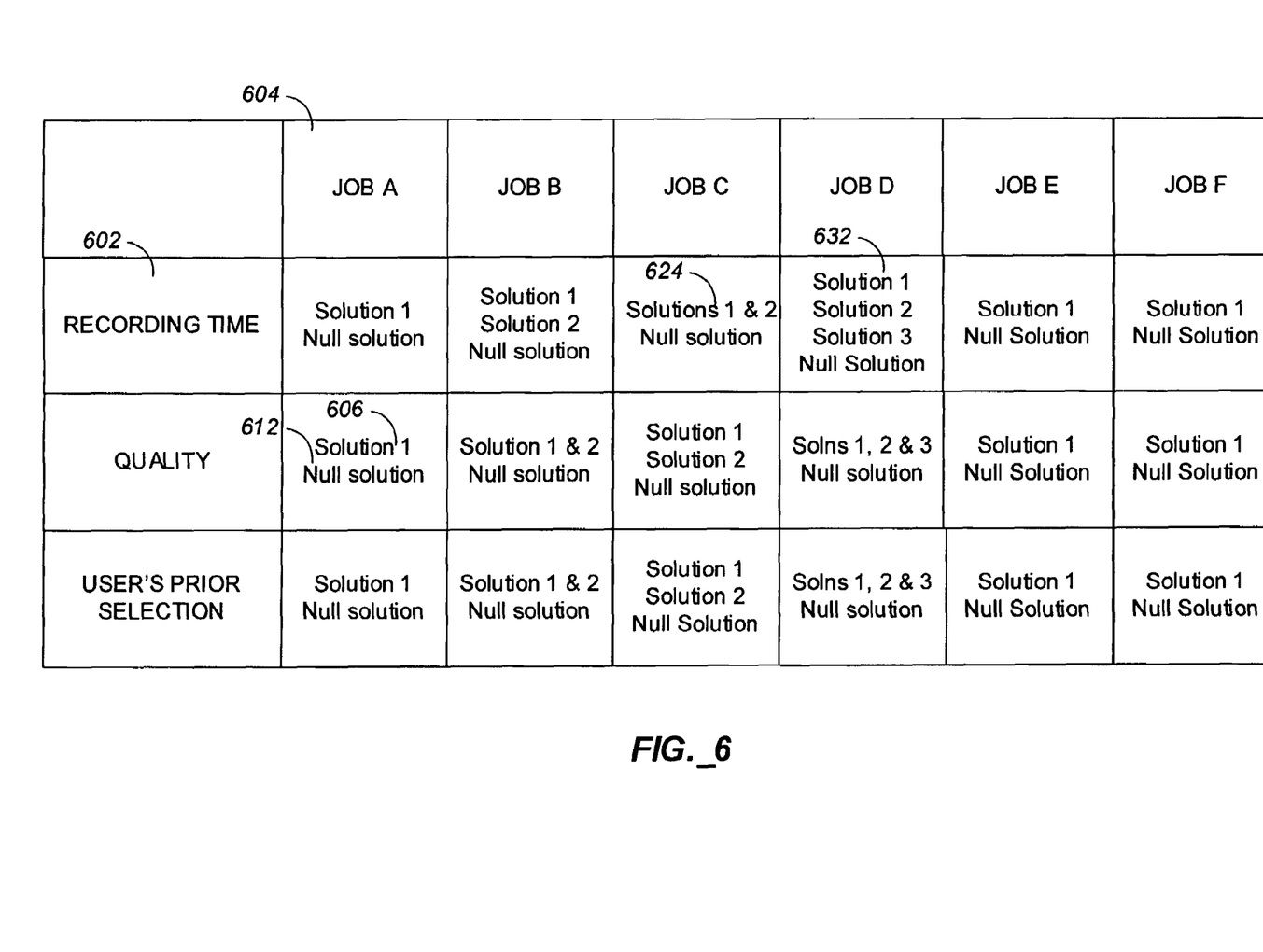
FIG. 6 shows a ranking of solutions for each job according to components for each of the solutions.

The solutions for each job 604 can be ordered according to their ratings, or scores, for each component 602, as shown in FIG. 6. A null solution 606 is typically lower rated than a non-null solution 612. For some solutions, solutions have equally rated non-null solution 624. For other solutions, some solutions 632 for a job are more highly rated than other solutions for the same job. The plans that are better in at least one way according to the priorities and solution components than other plans that can be compiled as follows:

| Plan | A | B | C | D | E | F |
|---|---|---|---|---|---|---|
| 1 | Solution 1 (402) | Solution 1 (408) | Solution 1 (414) | Solution 2 (436) | Solution 1 (442) | Null solution |
| 2 | Null solution | Solution 1 (408) | Solution 1 (414) | Solution 2 (430) | Solution 1 (442) | Null solution |
| 3 | Null solution | Solution 1 (408) | Solution 1 (414) | Solution 2 (436) | Solution 1 (442) | Solution 1 (450) |

Each of the plans includes not recording at least one of the jobs. This is required because there are only two tuners and thus insufficient resources to record every job. Because neither the first solution 408 nor the second solution 420 for job B overlaps intervals with another solution, either solution can be selected. Recording a job earlier is the default preferred solution, making the second solution for job B 420 less desirable than the first solution 408. Plans that include the second solution for job B 420 are no better than a plan that includes the first solution for job B 408 and do not need to be compiled. The first solution for job C 414 is recorded on a high definition channel 465 while the second solution for job C 426 is recorded on a standard definition channel 470. High definition solutions tend to be preferred over standard definition solutions. For job C, plans that include solution two 426 are no better than solution one 414 and are not compiled. Alternatively, plans that include the second solutions for jobs B 420 and C 426 may be compiled, but do not pass through the plan filter because they are not better or are worse than other plans.

A score is assigned to each of the solutions. The scores for each solution in a plan are added together to produce a plan score for each plan. As described above, the scores can be based on a combination of the priority for each job, the time at which each solution belongs to, and the quality of recording of each solution. Here, recording a job is assigned a much greater score than a null solution. Recording a job at an earlier time is given a higher score than at a later time, but the points allocation can be weighted such that the time points are much fewer than the points allocated for the priority of a job. According to the user's previous plan selections, the PVR has learned that a job that is a television series is assigned a higher priority than a news program. Job F is a series and job A is news program. When points are assigned to each of the plans and the plans are ordered by points, plan 3 has the greatest number of points, plan 1 has the next highest number of points and plan 2 has the least number of points.

The user is presented with the three plan options in order of score. The user decides that job A is more important than job F and thus selects plan one for the PVR to record. The PVR reviews the title, genre, and other characteristics of job A and stores the user's preference for job F over job A. The next time a conflict between jobs A and F occur in a plan, the PVR can assign greater priority to job A over job F.

Figure 7:
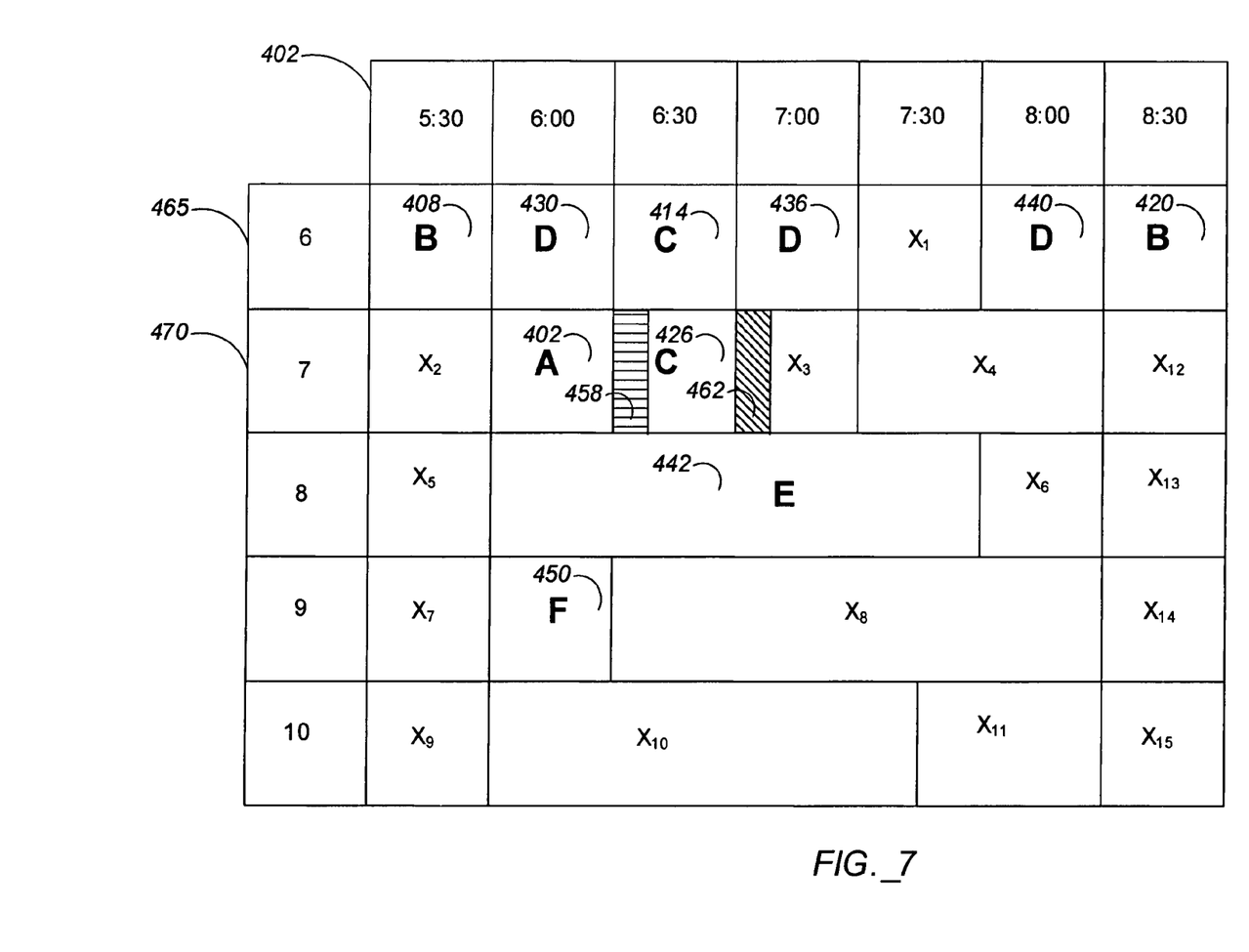
FIG. 7 shows an updated grid style television schedule with jobs and bonus time.

Referring to FIG. 7, the PVR receives an updated schedule 405 from the satellite indicating station seven 470 is running behind by about five minutes. The PVR responds by selecting 10 minutes of ending bonus time 458, 462 for the jobs recorded on channel seven 470. This causes job A to overlap the interval of the first solution for job C 414 and the solution for job E 442. The PVR reiterates through the combinations of plans, determining the following plans the user desires:

| Plan | A | B | C | D | E | F |
|---|---|---|---|---|---|---|
| 1 | Solution 1 (402) | Solution 1 (408) | Solution 2 (426) | Solution 3 (440) | Solution 1 (442) | Null solution |
| 2 | Null solution | Solution 1 (408) | Solution 1 (414) | Solution 2 (436) | Solution 1 (442) | Solution 1 (450) |

The PVR has determined the preferred plans based on the user's previous preferences and the need to add bonus time to job A 402 and solution 2 of job C 426 if they are recorded on channel seven 470. Although the second solution of job C 426 has a solution that is less desired than the first solution 414, more jobs can be accomplished with the second solution 426 than the null-solution for jobs A or C being used. The PVR presents the options to the user if the user is available or selects the higher scoring plan and records the jobs of the selected plan.

As described in the last example, the PVR can determine the likelihood of the job requiring bonus time as well as the quantity of bonus time. In one implementation, jobs that require more bonus time may have their priority rating increased. An example of a job with bonus time follows. A user inputs to record college football games on Saturdays as an ongoing job and inputs priority four for the job. The job is typically expected to have a duration of three hours. The television program schedule is updated to reflect that one week the job is allotted a time slot of four and a half hours rather than the standard three hours because that particular week is a bowl game. The PVR increases the priority of the job to a three, due to the increase in interval time or adding bonus time. When the PVR iterates through the plans, the job will have a higher priority than in previous weeks when the job was only assigned a priority of four. This can be advantageous in situations where a job covers a greater interval and capturing the entire job is important to the user. The PVR determines that these higher priority games may be more desirable to the user than the standard length games.

The conflicts resolution engine can use alternative methods for determining plans that the PVR will use to record jobs. Various implementations of determining plans or determining the plans that are presented to the user are described below.

In one implementation, the PVR can determine every possible plan and rank all of the plans by scores, rather than filtering the plans as they are compiled. The user can be presented with options of available plans. The list of options can be limited to the top three, four or five options, or any number of options. Alternatively, the number of choices can be limited if there is score discontinuity, i.e., if the seventh score is substantially lower than the top six scores, the PVR can display just the top six scores to the user. The user can select from these options and the selection can be used to help determine user preference for future scoring of plans.

In one implementation, a top-level loop type search is performed for plans that fit the user's preferences. Given a list of jobs to add, a system calls a procedure Add(list of jobs) with a maximum recursion depth of one, then two, then three, and so on until an arbitrarily set total number of solutions has been reached. If all the jobs can be added with no conflicts, the system can stop the search. Also, there is no need to increase the maximum recursion depth if the maximum conflict depth has already been reached. The system records the best plan(s) so far throughout the search.

In another implementation, a middle-loop search is performed. A PVR using the middle loop approach attempts to add all jobs into the list. If the PVR fails, the PVR then attempts to add all but the least important jobs, then all but next to least important job, and so on until the addition succeeds. The PVR can determine the order of the addition from the binary bits when counting from 0 to $2^n-1$, where a 1 bit indicates that a job is not to be included (set to null solution), the most important job(s) is assigned the most-significant bit, and the least important job is assigned the least-significant bit.

In yet another implementation, an inner loop search is performed. A PVR using the inner loop search selects one solution from each included job and evaluates the total score. The PVR then iterates through these combinations from best total score to worst total score. If the selected solutions can be added without causing any conflicts, the PVR saves the current plan and returns. If the maximum recursion depth has been reached, the system can set a flag and can indicate to a user that a greater recursion might help, and proceeds to the next inner loop.

Alternatively, when the inner loop search is performed the PVR can remove all jobs whose current solutions use resources that overlap with current solutions for current jobs. A user can lock jobs such that the conflicts resolution engine does not select a null solution for a job. The conflicts resolution engine can also be precluded from selecting a null solution for jobs whose solutions were set by the user who requested the current invocation of an Add procedure. If there is still a conflict, the PVR can proceed to the next inner loop. The PVR can then return these solutions, starting with the most important job, but skipping any solutions that still cause conflicts. The PVR can take back this new list of jobs whose current solutions cannot be added, add jobs that may have been negatively impacted, and recursively call the Add procedure.

When a job is removed, in some implementations, the PVR can re-optimize the solutions to any jobs that may have been impacted by the removed job. The PVR can examine each solution in an all solutions resource list to determine which solutions overlap with the solution being removed. If the overlapping solution's job's current solution is worse than the overlapping solution, then the job may have been negatively impacted.

In one implementation, other methods of determining preferred plans can be utilized. These methods are described in U.S. Provisional Application No. 60/439,068.

A number of embodiments of the invention have been described. Nevertheless, it will be understood that various modifications may be made without departing from the spirit and scope of the invention. For example, the invention is described as one that can be applied to PVRs, however the invention can similarly be applied to recording audio media. Accordingly, other embodiments are within the scope of the following claims.

What is claimed is:

1. A method comprising:
   receiving one or more inputs, the one or more inputs requesting recording of one or more of a plurality of jobs, each job identifying particular programming content to be recorded;
   determining one or more solutions for each job of the plurality of jobs based on a program schedule, the solutions including null solutions and non-null solutions, each non-null solution for a particular job requiring a set of resources over a set of intervals for recording the job, wherein one or more combinations of solutions for the plurality of jobs require a number of resources greater than a number of resources available at a particular interval, resulting in a scheduling conflict;
   resolving the scheduling conflict including automatically determining a plurality of plans for performing jobs, each plan having a combination of solutions including a particular solution for each of the plurality of jobs, wherein resources used by the plurality of jobs for the combination of solutions in each plan are less than or equal to the number of resources available at each interval;
   scoring each plan of the plurality of plans, where scoring each plan includes determining whether the plan includes a null solution to a job where the null solution to a job is a solution in which the job is not recorded and if so modifying the score for the plan based on having the null solution;
   automatically determining a preferred plan based on the scores, wherein the scores are based on components of each of the lobs, the components including at least one element selected from the group including a recording time, a recording quality, a type of program, a relative position in an order a job of the two or more jobs was input, an inclusion of bonus time and a keyword; and
   automatically using a the preferred plan of the one or more plans to determine a recording schedule for a personal video recorder system.

2. The method of claim 1, further comprising:
   receiving a priority for each job from a user.

3. The method of claim 1,
   where scoring each plan includes assigning scores based on a user assigned priority for each job.

4. The method of claim 1, further comprising:
   ranking the one or more plans based on the scores.

5. The method of claim 1, wherein:
   the step of determining one or more plans includes determining two or more plans.

6. The method of claim 1, further comprising:
   receiving a trigger;
   in response to receiving the trigger, determining one or more new solutions for the plurality of jobs; and
   determining a new plan including one new solution for each job such that the solutions use less than or equal to the number of resources available.

7. The method of claim 6, wherein:
   the step of receiving the trigger includes receiving an updated program schedule from an input source.

8. The method of claim 6, wherein:
   the step of receiving the trigger includes receiving an updated program schedule from an input source, the input source selected from a group including a satellite signal, a cable signal, an antenna signal, and a telephone line signal.

9. The method of claim 6, wherein:
the step of receiving the trigger includes receiving a user input.

10. The method of claim 1, further comprising:
providing a user with the two or more plans; and
receiving a first user input that indicates a preferred plan.

11. The method of claim 10, further comprising:
determining from the first user input a user priority for at least one job.

12. The method of claim 11, further comprising:
receiving a second user input adding a new job;
determining one or more new solutions for the new job; and
determining a new plan including one of the one or more new solutions, wherein determining the plan is based in part on the first user input.

13. The method of claim 1, wherein:
the step of determining one or more plans includes determining the one or more plans based on a pre-defined user preference.

14. The method of claim 13, further comprising:
filtering the one or more plans including keeping a first plan for presentation to a user and ignoring a second plan so that the second plan is not presented to the user.

15. The method of claim 14, wherein:
the first plan has a first set of solutions for the plurality of jobs and the second plan has a second set of solutions for the plurality of jobs, wherein at least one solution for at least one job of the first set of solutions is preferred over a corresponding solution for the at least one job of the second set of solutions.

16. The method of claim 13, further comprising:
scoring the one or more plans based on the pre-defined user preference; and
filtering the one or more plans such that at least one plan with a higher score than other plans of the one or more plans is presented to a user and at least one plan with a lower score than other plans of the one or more plans is not presented to the user.

17. The method of claim 1, further comprising:
presenting the one or more plans to the user.

18. The method of claim 17, wherein:
presenting the one or more plans to the user includes presenting the plans in a first category and a second category, the first category including zero or more plans having no null solutions and the second category including zero or more plans having at least one null solution.

19. The method of claim 1, wherein:
the step of receiving the one or more inputs requesting the plurality of jobs includes receiving an input request to record a program.

20. The method of claim 1, wherein:
the step of receiving the one or more inputs requesting the plurality of jobs includes receiving an input request to accomplish a task.

21. A method comprising:
receiving one or more inputs, the one or more inputs requesting recording of one or more of a plurality of jobs, each job identifying particular programming content to be recorded;
determining one or more solutions for each job of the plurality of jobs based on a program schedule, the solutions including null solutions and non-null solutions, each non-null solution for a particular job requiring a set of resources over a set of intervals for recording the corresponding job, wherein one or more combinations of solutions for the plurality of jobs require a number of resources greater than a number of resources available at a particular interval, resulting in a scheduling conflict;
resolving the scheduling conflict including automatically determining one or more plans for performing jobs, each plan having a combination of solutions including a particular solution for each of the plurality of jobs, wherein resources used by the plurality of jobs for the combination of solutions in each plan are less than or equal to the number of resources available at each interval, where determining each plan includes scoring each job of the plurality of jobs and identifying a high scoring solution for a first job of the plurality of jobs and identifying solutions for each other job of the plurality of jobs compatible with the high scoring solution of the first job, where scoring each job includes determining whether the plan includes a null solution to the job where the null solution to a particular job is a solution in which the particular job is not recorded and if so modifying the score for the job based on having the null solution;
automatically determining a preferred plan based on the scores, wherein the scores are further based on components of each of the jobs, the components including at least one element selected from the group including a recording time, a recording quality, a type of program, a relative position in an order a job of the two or more lobs was input, an inclusion of bonus time and a keyword; and
automatically using the preferred plan of the one or more plans to determine a recording schedule for a personal video recorder system.

* * * * *